Feb. 16, 1954

W. W. PHARIS

AUTOMATIC TELEPHONE SYSTEM SELECTOR WITH MESSAGE RATE METER CONTROL 2,669,607

Filed Oct. 11, 1952

3 Sheets-Sheet 1

INVENTOR.
WILLIAM W. PHARIS

BY Francis E. Blake

ATTORNEY

Feb. 16, 1954

W. W. PHARIS 2,669,607

AUTOMATIC TELEPHONE SYSTEM SELECTOR WITH MESSAGE RATE METER CONTROL

Filed Oct. 11, 1952

3 Sheets-Sheet 2

INVENTOR.
WILLIAM W. PHARIS
BY Francis E. Blake
ATTORNEY

Feb. 16, 1954

W. W. PHARIS

AUTOMATIC TELEPHONE SYSTEM SELECTOR WITH MESSAGE RATE METER CONTROL 2,669,607

Filed Oct. 11, 1952

3 Sheets-Sheet 3

INVENTOR.
WILLIAM W. PHARIS
BY Francis E. Blake
ATTORNEY

Patented Feb. 16, 1954

2,669,607

UNITED STATES PATENT OFFICE 2,669,607

AUTOMATIC TELEPHONE SYSTEM SELECTOR WITH MESSAGE RATE METER CONTROL

William W. Pharis, Rochester, N. Y., assignor to Stromberg-Carlson Company, a corporation of New York Application October 11, 1952, Serial No. 314,365

6 Claims. (Cl. 179—8)

The present invention relates to automatic telephone systems and more particularly to improved arrangements for counting and recording the number of chargeable completed calls from the respective calling lines associated with the automatic telephone system.

It is well known to connect peg-count meters in the line circuits of calling lines in a manner to indicate and record the number of calls completed through the respective calling line circuit. In order to control the operation of the peg-count meter in the manner to record only those chargeable calls that are completed through the line circuit, reverse battery supervision has been used. As is well known, the conventional automatic telephone systems are arranged to reverse the talking battery connections to the tip and ring conductors when the called party answers and this reversal of battery may therefore be indicative of a completed call. Prior to this invention, each of the line circuits for each calling line required circuits and apparatus to respond to the aforementioned reversal of battery and actuate the peg-count meter. Obviously, the requirement of individual reverse battery responsive apparatus for each line circuit is expensive and complicated.

It is the principal object of the present invention to provide an automatic telephone system having an improved arrangement for controlling and operating the peg-count meters of each line circuit to indicate and record the number of chargeable calls through each line circuit.

Another object of the invention is to provide an improved peg-count meter circuit for use with the line circuits of an automatic telephone system which eliminates the requirement of individual reverse battery responsive circuits and apparatus for the peg-count meter of each line circuit.

A feature of the invention in its application to an automatic telephone system of the type employing linefinder selector links having in addition to the usual tip, ring and sleeve conductors, a fourth conductor known as the hunt sleeve conductor, is the provision in the linefinder selector link of a reverse battery responsive peg-count meter control circuit connected to return a meter operating signal over the fourth conductor to the peg-count meter of the line circuit for the calling line. With such an arrangement the individual reverse battery responsive peg-count meter control equipment for each line circuit is eliminated and the required numbers of such equipment may be limited to the number of linefinder selector links in the telephone system.

Figure 1:
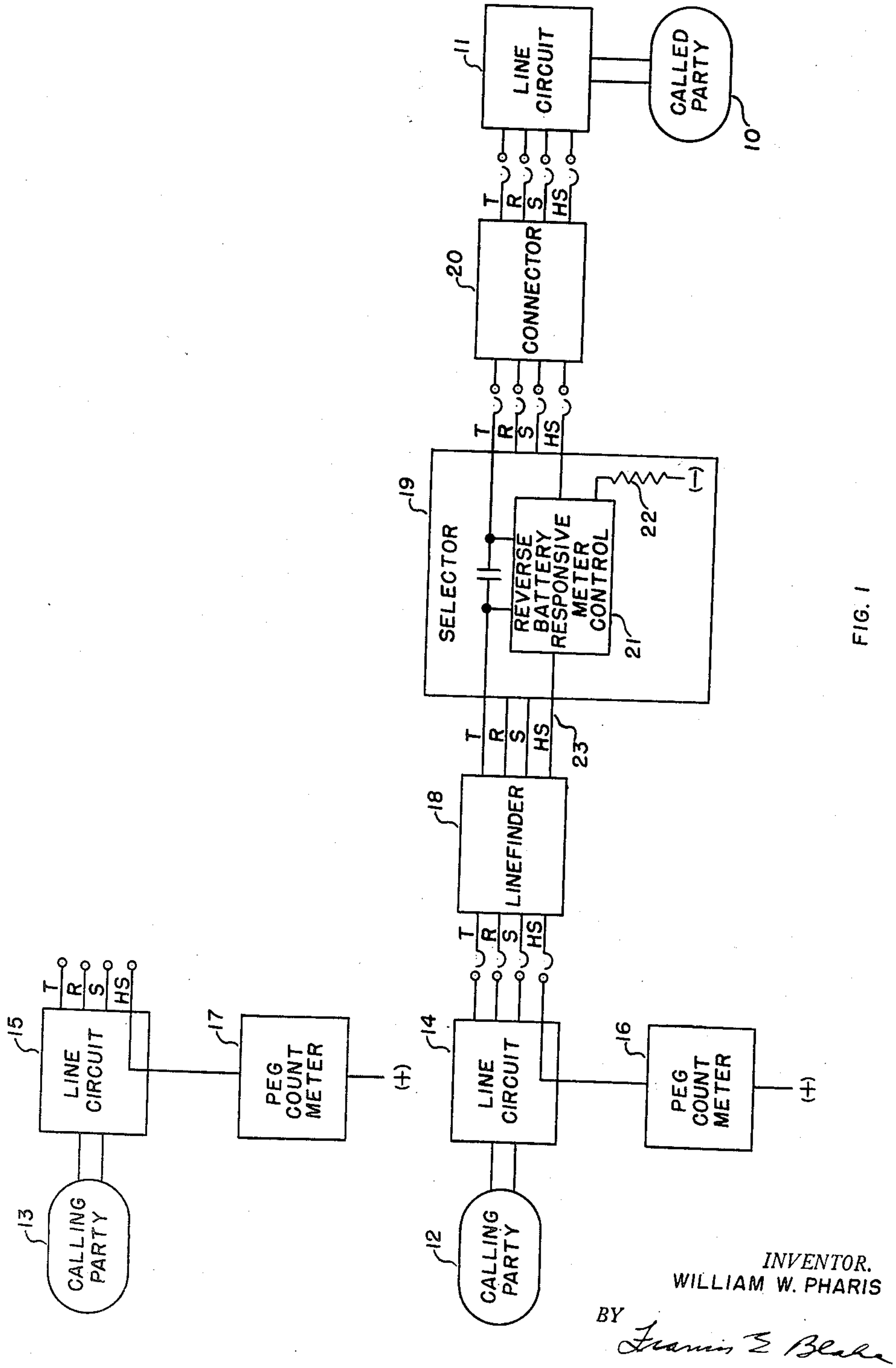
Figure 2:
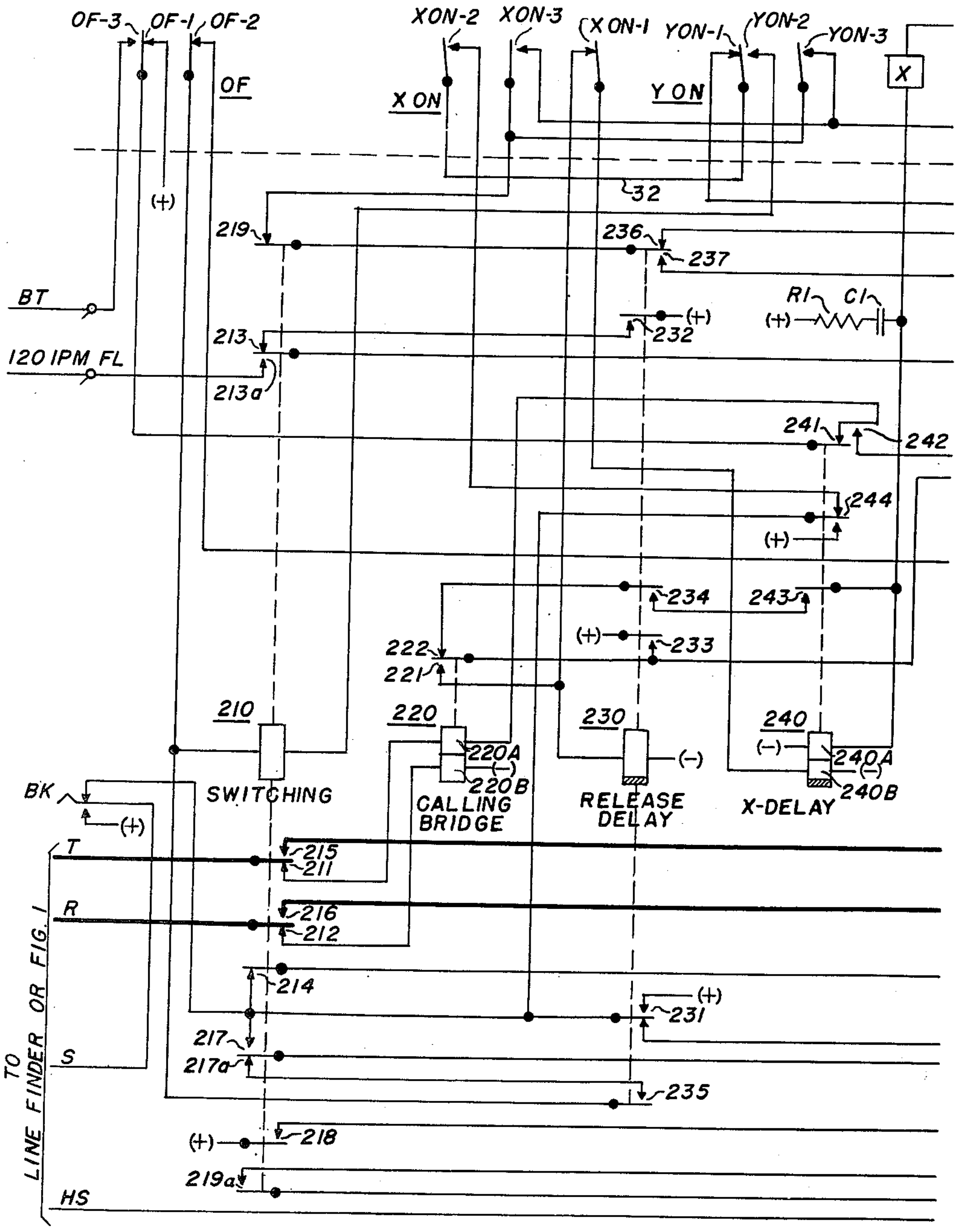
Figure 3:
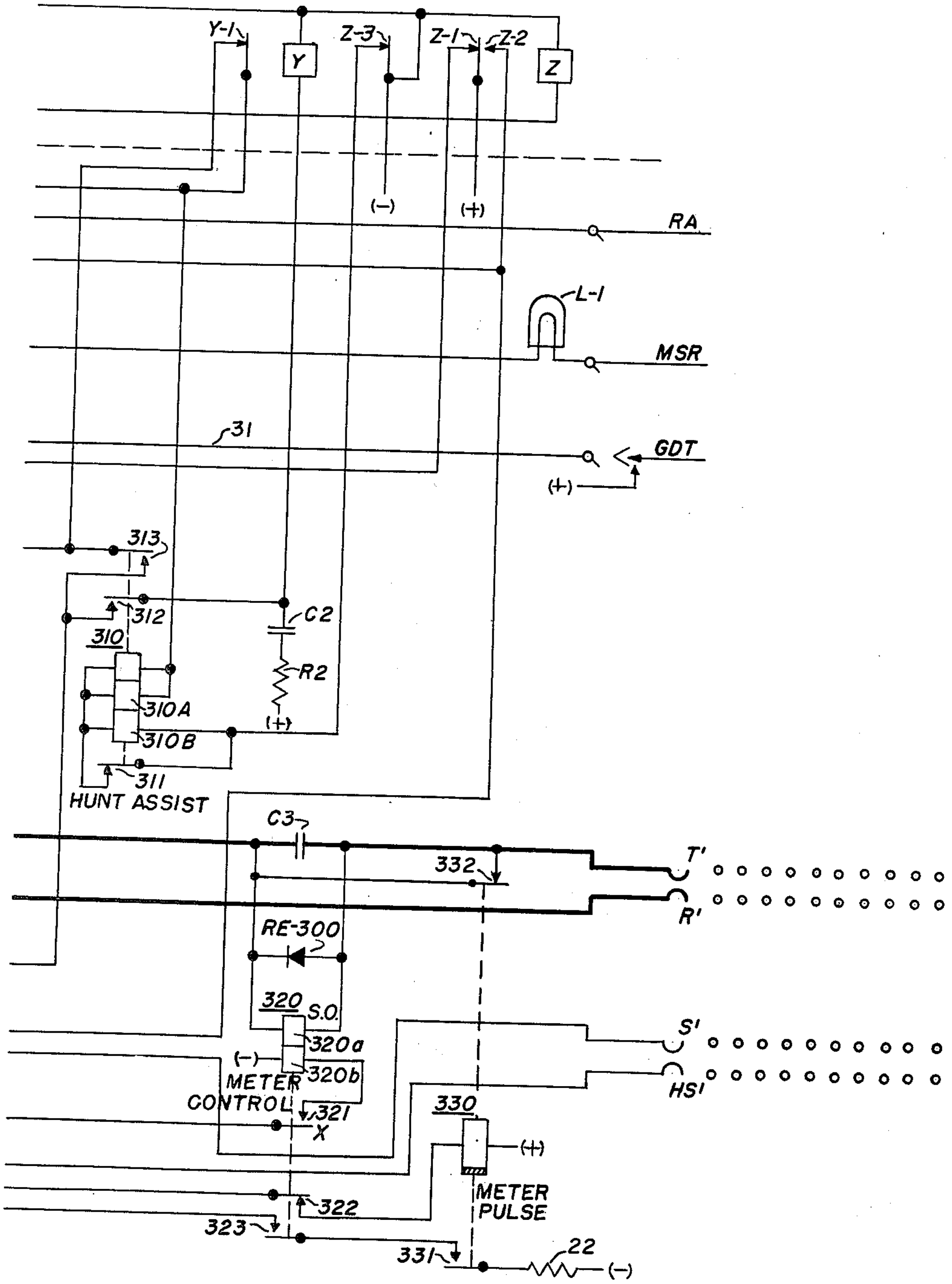

Further objects, features and the attending advantages of the invention will be apparent with reference to the following specification and drawings in which:

Fig. 1 is a block diagram to show a simplified form of automatic telephone system embodying the peg-count meter control of the invention;

Figs. 2 and 3, with Fig. 3 placed to the right of Fig. 2, show the schematic diagram of a selector portion of the linefinder selector link embodying the reverse battery responsive meter circuit control apparatus.

Referring to Fig. 1 of the drawings, the simplified automatic telephone system may, for example, include a single called line 10 and associated line circuit 11 and two calling lines 12 and 13 with their associated line circuits 14 and 15, respectively. It should be understood that any number of calling and called lines may be provided within the limits of the automatic telephone system. Each of the line circuits 14 and 15 for the calling lines is provided with a peg-count meter such as shown at 16 and 17, respectively. The peg-count meters are well known devices which generally employ an operating coil to actuate the counting mechanism. As shown in Fig. 1, one terminal of the peg-count meter coil is connected to ground (+) and the other terminal is connected to the fourth, or hunt sleeve conductor of the associated line circuit. A linefinder selector link including the linefinder 18 and selector 19 is interposed between the calling party line circuits and the connector 20 for selective connection with the called party line circuit 11. The linefinders, selectors and connectors may be all directively operated in the conventional manner under the control of the dial impulses from the calling party line.

When the called party answers, the polarity of the talking battery connections for the tip and ring conductors are reversed and, as shown in Fig. 1, the selector 19 is provided with reverse battery responsive meter control apparatus 21 which functions to connect a single pulse of battery (—) through the resistance 22 to the HS conductor 23, through the linefinder 18, and to either line circuit 14 or 15 depending upon which calling line is connected with the linefinder 18 for operating the associated peg-count meter 16 or 17. According to a preferred form of the invention, the reverse battery responsive meter control 21 is arranged to provide only a momentary pulse connection of the resistance battery to the HS conductor for operating the peg-count meter so that the coil of the meter is not continuously energized during the length of the call, thus reducing power consumption. Furthermore, the arrangement is such that after the meter operating pulse is returned when the called party answers, no other operating pulses may be returned regardless of momentary operation of hookswitches by either called or calling parties. It should be pointed out that although the reverse battery responsive meter control apparatus 21 has been shown as connected to the tip conductor in the selector 19, it should be obvious to those skilled in the art that the meter control apparatus 21 might be similarly connected to the ring conductor or might be connected to either the tip or ring conductor in the linefinder circuit 18. The principal feature of the invention, however, is the provision of the reverse battery responsive meter control apparatus in the linefinder selector link which normally services a plurality of calling lines and associated line circuits and peg-count meters.

Reference is next made to Figs. 2 and 3 for a detailed description of the operation of selector 19. In the drawings, the battery designations (+) and (−) are used, and hereinafter the expression "battery" will indicate the negative terminal of the battery and the (+) symbol will indicate the positive terminal of the battery, and it is to be understood that the positive terminal of the battery is also connected to ground so that the use of the word "ground" is indicative of a connection not only to ground but also to the positive terminal of the station battery.

The selector switch mechanism for use with the circuit of the invention is preferably of the step-by-step type and, for example, may be of the flat type in which the main set of switch wipers move in a single plane, the secondary or Y movement being at right angles to the primary or X movement. The switch shown in the drawings comprises a main set of wipers including four wipers or brushes designated as tip, T', ring, R', sleeve, S' and hunt sleeve HS', respectively. The switch also includes a set of overflow switches OF, off-normal switches XON which are operated when the switch moves off-normal in the primary or X direction and a second set of off-normal switches YON which operate when the switch takes its first step in the Y direction. The switch further includes primary and secondary direction magnets, X and Y, respectively, and a release magnet Z together with release magnet interrupter switch contacts Z1—Z3.

Assuming that the previous switching equipment including the line-finder 18 has been extended to the tip, ring, sleeve and hunt leads T, R, S and HS, respectively, a cricuit is completed for operating the calling bridge relay 220 over a loop extending from ground appearing on the normal contacts OF-1 of the overflow switch pile-up through normal contacts 241, winding 220A, normal contacts 211, tip lead T, calling loop, ring lead R, normal contacts 212 and winding 220B to battery. In response to the operation of relay 220, the delay relay 230 and the X-delay relay 240 are energized in parallel over circuits extending from ground appearing on the normal contacts Z-1 of release magnet Z through operated contacts 221 and winding of relay 230 to battery and from ground through normal contacts Z-1, operated contacts 221, normal contacts XON-1 of the X off-normal pile-up XON and through winding 240B to battery, respectively.

The operation of delay relay 230 effects the application of ground to the back sleeve lead S through operated contacts 231 and busy key BK. The operation of relay 230 also extends ground through operated contacts 232 and normal contacts 213 to the monitor-supervisory lead MSR including the lamp L-1. If it is desired to furnish dial tone from the selector of Figs. 2 and 3, the dial tone lead GDT, Fig. 3, is connected to the tip side of the line through conductor 31, operated contacts 242, winding 220A of relay 220 and normal contacts 211. With this arrangement, dial tone is removed when X-delay relay 240 releases at the completion of the group of impulses of the first digit.

When the calling party dials the first digit, the loop applied to the calling bridge relay 220 is interrupted according to the number of impulses for the digit dialed and thereby relay 200 pulses. Upon each closure of normal contacts 222, ground by way of operated contacts 233 is applied through normal contacts 222, operated contacts 234 and 243, and the primary direction magnet X to battery, resulting in the stepping of the selector switch in the primary direction.

Referring back now to the energization of the stepping magnet X, the main set of wipers has been moved one step in the X direction. It is noted at this point that both delay relays 230 and 240 are provided with slow-to-release characteristics so that both of these relays hold operated over the train of dial pulses referred to above. When the selector switch takes the first step in the X direction, the X off-normal contact springs XON operate and thereby de-energize winding 240B at now open contacts XON-1 but relay 240 holds operated until the last impulse has been received over a circuit extending from battery through winding 240A, operated contacts 243 and 234, normal contacts 222 and operated contacts 233. Thus, relay 240 holds operated over the pulsing ground through the pulsing contacts 222 of the calling bridge relay 220. Relay 240 releases at the end of the delay period following the conclusion of the dialed digit at which time ground on operated contacts 231 of relay 230 (relay 230 remaining energized through operated contacts 233 and now closed contacts 221) is conducted through normal contacts 244, operated off-normal contacts XON-2, conductor 32, normal contacts YON-1 of the Y off-normal springs, winding 310A of hunt relay 310, normal contacts 311 and normal contacts Z-3 of the release magnet Z to battery.

The foregoing circuit operates relay 310 to close a path for operating the stepping magnet Y over a circuit extending from battery through magnet Y, operated contacts 312, normal contacts 214 and operated contacts 231 to ground. This circuit energizes stepping magnet Y and causes the selector switch to move one step in the secondary or Y direction into the level of the bank of contacts or terminals.

At this point it should be noted that upon the operation of relay 310, that relay is locked up from ground on operated contacts 231 through normal contacts 214, operated contacts 313, Y interrupter springs Y-1 to winding 310A. Thus, relay 310 is held operated until the stepping magnet Y operates to open the interrupter springs Y-1.

As the switch advances in the Y direction, the sleeve or test wiper S' is employed to make the usual busy test. Means (not shown) is provided for applying a desired potential, usually ground, upon the sleeve bank terminals or contacts in the sleeve banks to indicate a busy condition of the line or trunk terminating at that contact or terminal. If the first sleeve or test contact is not marked as busy, a circuit is completed for operating the switching relay 210 to extend the back tip and ring leads T and R to the tip and ring brushes T' and R', respectively, in order to extend the call to the succeeding equipment. For this purpose ground is forwarded from operated contacts 231 through normal contacts 244, operated contacts XON-2, conductor 32, operated contacts YON-2, winding of switching relay 210, normal contacts OF-2 of the overflow pile-up OF, Y interrupter Y-1, windings 310A and 310B in series, through release magnet switch contacts Z-3 to battery. Relay 210 operates from the resulting current flow over the above described path but relay 310 does not operate because that relay is not designed to operate on the relatively low current now flowing.

Operation of relay 210 extends the tip and ring leads T and R to the tip and ring brushes T' and R', respectively, at operated contacts 215 and 216, respectively. The sleeve lead S is extended to the sleeve or test wiper S' at operated contacts 217. The circuit for maintaining relay 220 is thus broken at contacts 211 and 212 and the resulting release of relay 220 de-energizes relay 230 at now open contacts 221 and, after a time delay, relay 230 releases.

The foregoing discussion related to the test brush S' encountering an idle outlet contact. It may now be assumed that the test wiper S' encounters a busy outlet or contact as indicated by the presence of ground on the first test contact. Ground thereby appears on the sleeve wiper S' and is conducted through normal contacts 217*a* and operated contacts 235 to winding of relay 210. Inasmuch as the other terminal of winding of relay 210 is connected to ground through off-normal springs YON-2, conductor 32, off-normal contacts XON-2, normal contacts 244 and operated contacts 231, relay 210 is shunted down by the presence of ground on both sides of the coil. Therefore the switching relay 210 cannot operate. This sleeve ground indicative of a busy condition is also conducted through overflow springs OF-2 and interrupter contacts Y-1 to the operating winding 310A in order to reoperate relay 310.

Upon the reoperation of relay 310, stepping magnet Y is again operated from ground by way of operated contacts 312 so that the Y magnet receives another pulse to advance the switch to the second position in the level. In order to assure that the Y magnet will operate and that switching relay 210 will remain shunted until the next contact in the level is reached, ground on operated contacts 231 is forwarded through normal contacts 214, operated contacts 313, interrupter contacts Y-1 to relay winding 310A and thence to battery by way of normal contacts 311 and contacts Z-3, thereby holding operated relay 310.

At the next test contact, the foregoing busy test is repeated. If the outlet is idle the selector is switched through but if the outlet is busy the selector continues to hunt until an idle outlet is found. If all outlets are busy the switch steps into the Y overflow position, thereby operating the overflow pile-up OF. Operation of the overflow springs is utilized to prevent further operation of relay 310 because of the opening of its operating circuit at contacts OF-2. Busy tone is forwarded from the busy tone lead BT through operated overflow contacts OF-3, normal contacts 241, winding 220A, normal contacts 211 and tip lead T to the calling line or incoming trunk, thereby informing the calling party that all levels are busy.

Assuming that the succeeding circuit is seized, ground is returned on the front sleeve in any suitable manner by way of test wiper S' through operated contacts 217, normal contacts 244, operated XON-2 contacts, conductor 32, operated off-normal contacts YON-2 to relay winding 210 in order to hold relay 210 operated.

The circuit of Figs. 2 and 3 is released upon the removal of ground in the succeeding circuit as by hanging up by the called party. Release of relay 210 effects energization of release magnet Z from ground (not shown) on lead RA through normal contacts 236 and 219, operated contacts XON-3 and YON-3 in parallel through the release magnet Z to battery.

*Reverse battery responsive meter control operation*

When dialing is completed and the called party answers, the talking battery appearing across tip and ring conductors is usually reversed as is customary in the art. However, it will be noted that the condenser C3, rectifier RE300 and winding 320A of relay 320, are all normally short-circuited by the circuit including normally closed contacts 332. It is desirable to normally short-circuit the components mentioned in the preceding sentence at all times except during the momentary operation of the circuit to return the peg-count meter operating signal in order to provide efficient and properly balanced talking connections over the line. It should also be pointed out that certain calls may not be chargeable such as, for example, calls to a toll operator or an information trunk or the like. Under certain conditions of operation of the circuit to prevent operation of the peg-count meter for calls not to be charged, battery is not connected to the HS' switch brush. Under other conditions of operation, the talking battery across the tip and ring conductors is not reversed to thus prevent operation of the peg-count meter control system of the invention.

Considering first the operation of the circuit when the dialing is completed for a chargeable call and the party answers to reverse the talking battery connections, meter pulse relay 330 is first operated from battery appearing on the HS' switch brush through normally closed contacts 219 and 332 to the winding of relay 330 and ground. The operation of relay 330 closes contacts 331 to prepare a circuit for transmitting a pulse of battery through the resistance 22 to the HS lead of the preceding circuit and the peg-count meter. The operation of relay 330 also opens contacts 332 to remove the short-circuit across condenser C3, rectifier RE300 and coil 320A of relay 320. With talking battery reversed, the rectifier RE300 presents a high-resistance to the flow of current therethrough and coil 320A is thereby energized to operate the slow operating relay 320. The operation of relay 320 closes contacts 323 to complete the circuit for forwarding battery through resistor 22, operated contacts 331 and 323 to the HS lead and the peg-count meter in the line circuit of the calling line. The connection of battery as described, operates the peg-count meter to record the completed connection as initiated by the answering of the called party. The operation of relay 320 also closes preliminary make contacts 321 to establish a holding circuit for itself through winding 320B and operated contacts 218. The operation of relay 320 also opens contacts 322 to restore the meter pulse relay 330 which is of the slow release type and open contacts 331, thus again opening the operating circuit for the peg-count meter. Since relay 320 is slow-to-operate and relay 330 is slow-to-release, a momentary pulse of battery for operating the peg-count meter is assured during the time interval when both contacts 323 and 331 are operated. Also, the slow operation of relay 320 assures that the slow release relay 330 will be fully operated and saturated before its operating circuit is opened by the operation of relay 320.

The previously described holding circuit for relay 320 as established through operated contacts 321, locks up the relay 320 to restore relay 330 and prevent any subsequent inadvertent operation and release of either relays 320 and 330 in a manner to reoperate the peg-count meter of the calling line circuit during a particular call. In addition, the restoration of meter pulse relay 330 recloses contacts 332 to again short-circuit the condenser C3, rectifier RE300 and winding 320A to provide maximum efficiency and correct balance for the talking line.

It will be noted that relay 320 cannot be operated until after relay 330 has been operated in view of the normally closed contacts 332. As pointed out above, relay 330 is not operated unless battery is connected to the HS' brush which is normally the case when the connection is completed for a chargeable call. However, under certain conditions of operation, battery may be connected to the HS' brush for a call which is nevertheless not to be charged, and when it is desired to prevent the operation of the peg-count meter and similarly prevent a charge for the call, talking battery is not reversed. Under such conditions, the meter pulse relay 330 will be operated as previously described from battery on the HS' brush and contacts 332 will be operated to remove the short-circuit across the condenser C3, rectifier RE300 and operating coil 320A of meter control relay 320. Now, however, without reversal of talking battery, the rectifier RE300 presents a low impedance to the flow of current therethrough due to the relationship of the polarity of its connection to the polarity of talking battery and therefore insufficient current flows through the operating winding 320A of meter control relay 320 so that such relay does not operate. Therefore, contacts 323 remain normally open and no peg-count meter operating signal is returned over the HS lead.

While the invention has been described particularly in connection with its application to an automatic telephone system employing a fourth conductor between the selecting elements of the system, it should be understood that the principles of the invention may be applied equally as well to other forms of automatic telephone systems provided the reverse battery responsive meter control elements are connected in the finder selector links of the system in a manner to eliminate the requirement of individual ones of such meter control apparatus for each line circuit.

A similar peg-count meter system has been disclosed but not claimed in my copending patent application, Serial Number 312,686, entitled Selector Circuit for Automatic Telephone Systems, filed October 2, 1952.

Various modifications may be made within the spirit of the invention and the scope of the appended claims.

What I claim is:

1. In an automatic telephone system having a plurality of calling lines and line circuits for each calling line together with one or more linefinder selector links, the selectable connections between each line circuit and the linefinder selector link including tip, ring, sleeve and fourth control conductors, the system being arranged to reverse connections of the talking battery to the tip and ring conductors when the called party answers to complete a call, the apparatus for indicating the number of chargeable completed calls from each line circuit comprising, a source of power, a peg-count meter for each line circuit having an operating coil connected in series with the fourth control conductor of each line circuit and one terminal of said source of power, a condenser in series with one of the tip and ring conductors in each of said linefinder selector links, a rectifier connected in parallel with said condenser and having a polarity of connections such that the rectifier presents low impedance to the passage of said talking battery direct current before its reversal when the called party answers, and a relay connected in parallel with said rectifier and condenser, said relay being adapted to be operated when said talking battery connections are reversed and said rectifier presents a high impedance to the passage of the reversed battery direct current, said relay having contacts to be operated to connect the fourth control conductor in each link to the other terminal of said source of power to thereby energize the operating coil of the peg-count meter of the line circuit selectably connected with the linefinder selector link to indicate a completed call through such calling line circuit.

2. In an automatic telephone system having a plurality of calling lines and line circuits for each calling line together with one or more linefinder selector links, the selectable connections between each line circuit and the linefinder selector link including tip, ring, sleeve and fourth control conductors, the system being arranged to reverse connections of the talking battery to the tip and ring conductors when the called party answers to complete a call, the apparatus for indicating the number of chargeable completed calls from each line circuit comprising, a source of power, a peg-count meter for each line circuit having an operating coil connected in series with the fourth control conductor of each line circuit and one terminal of said source of power, a condenser in series with one of the tip and ring conductors in each of said linefinder selector links, a rectifier connected in parallel with said condenser and having a polarity of connections such that the rectifier presents low impedance to the passage of said talking battery direct current before its reversal when the called party answers, a first slow operating relay connected in parallel with said rectifier and condenser, a circuit including first normally closed switch contacts connected to short circuit said first relay, said first relay being adapted to be operated when said switch contacts are opened and said talking battery connections are reversed so that said rectifier presents a high impedance to the passage of the reversed battery direct current, a second slow release relay, said first relay having a second set of normally closed contacts to prepare an operating circuit for said second relay, the operation of said first relay being effective to open said second normally closed contacts in the operating circuit of said second relay and to connect a holding circuit for said first relay, means to operate said second relay when said selectable connections are connected to a line for completing a chargeable call, the operation of said second relay being effective to open said first normally closed switch contacts, the operation of said first and second relays being effective to close series connected switch contacts to connect the fourth control conductor in each link to the other terminal of said source of power to thereby momentarily energize the operating coil of the peg-count meter of the line circuit selectably connected with the linefinder selector link to indicate a completed call through such calling line circuit.

3. In an automatic telephone system having a plurality of calling lines and line circuits for each calling line together with one or more linefinder selector links, the selectable connections between each line circuit and the linefinder selector link including tip, ring, sleeve and fourth control conductors, the system being arranged to reverse connections of the talking battery to the tip and ring conductors when the called party answers to complete a call, the apparatus for indicating the number of chargeable completed calls from each line circuit comprising, a source of power, a peg-count meter for each line circuit having an operating coil connected in series with the fourth control conductor of each line circuit and one terminal of said source of power, a condenser in series with one of the tip and ring conductors in the selector of each of said linefinder selector links, a rectifier connected in parallel with said condenser and having a polarity of connections such that the rectifier presents low impedance to the passage of said talking battery direct current before its reversal when the called party answers, a first slow operating relay connected in parallel with said rectifier and condenser, a circuit including first normally closed switch contacts connected to short circuit said first relay, said first relay being adapted to be operated when said switch contacts are opened and said talking battery connections are reversed so that said rectifier presents a high impedance to the passage of the reversed battery direct current, a second slow release relay, said first relay having a second set of normally closed contacts to prepare an operating circuit for said second relay, the operation of said first relay being effective to open said second normally closed contacts in the operating circuit of said second relay and to connect a holding circuit for said first relay, means to operate said second relay when said selectable connections are connected to a line for completing a chargeable call, the operation of said second relay being effective to open said first normally closed switch contacts, the operation of said first and second relays being effective to close series connected switch contacts to connect the fourth control conductor of the selector in each link to the other terminal of said source of power to thereby momentarily energize the operating coil of the peg-count meter of the line circuit selectably connected with the linefinder selector link to indicate a completed call through such calling line circuit.

4. In an automatic telephone system having a calling line and a calling line circuit together with a linefinder selector link, the connections between the line circuit and the linefinder selector link including tip, ring, sleeve and fourth control conductors, the system being arranged to reverse connections of the talking battery to the tip and ring conductors when the called party answers to complete a call, the apparatus for indicating the number of chargeable completed calls from the calling line circuit comprising, a source of power, a peg-count meter having an operating coil connected in series with the fourth control conductor of said calling line circuit and one terminal of said source of power, a condenser in series with one of the tip and ring conductors in the linefinder selector link, a rectifier connected in parallel with said condenser and having a polarity of connections such that the rectifier presents low impedance to the passage of said talking battery direct current before its reversal when the called party answers, and a relay connected in parallel with said rectifier and condenser, said relay being adapted to be operated when said talking battery connections are reversed and said rectifier presents a high impedance to the passage of the reversed battery direct current, said relay having contacts to be operated to connect the fourth control conductor in said link to the other terminal of said source of power to thereby energize the operating coil of the peg-count meter to indicate a completed call through the calling line circuit.

5. In an automatic telephone system having a plurality of calling lines and line circuits for each calling line together with one or more linefinder selector links, the selectable connections between each line circuit and the linefinder selector link including tip, ring, sleeve and fourth control conductors, the system being arranged to reverse connections of the talking battery to the tip and ring conductors when the called party answers to complete a call, the apparatus for indicating the number of chargeable completed calls from each line circuit comprising, a course of power, a peg-count meter for each line circuit having an operating coil connected in series with the fourth control conductor of each line circuit and one terminal of said source of power, a condenser in series with one of the tip and ring conductors in each of said linefinder selector links, a rectifier connected in parallel with said condenser and having a polarity of connections such that the rectifier presents low impedance to the passage of said talking battery direct current before its reversal when the called party answers, a first slow operating relay connected in parallel with said rectifier and condenser, said first relay being adapted to be operated when said talking battery connections are reversed so that said rectifier presents a high impedance to the passage of the reversed battery direct current, a second slow release relay, said first slow operating relay having a set of normally closed contacts to prepare an operating circuit for said second relay, the operation of said first relay being effective to open the normally closed contacts in the operating circuit of said second relay and to connect a holding circuit for said first relay, means to operate said second relay through said normally closed contacts when said selectable connections are connected to a line for completing a chargeable call, the operation of said first and second relays being effective to close series connected switch contacts to connect the fourth control conductor in each link to the other terminal of said source of power to thereby momentarily energize the operating coil of the peg-count meter of the line circuit selectably connected with the linefinder selector link to indicate a completed call through such calling line circuit.

6. In an automatic telephone system having a plurality of calling lines and line circuits for each calling line together with one or more linefinder selector links, the selectable connections between each line circuit and the linefinder selector link including tip, ring, sleeve and fourth control conductors, the system being arranged to reverse connections of the talking battery to the tip and ring conductors when the called party answers to complete a call, the apparatus for indicating the number of chargeable completed calls from each line circuit comprising, a source of power, a peg-count meter for each line circuit having an operating coil connected in series with the fourth control conductor of each line circuit and one terminal of said source of power, a condenser in series with one of the tip and ring conductors in the selector of each of said linefinder selector links, a rectifier connected in parallel with said condenser and having a polarity of connections such that the rectifier presents low impedance to the passage of said talking battery direct current before its reversal when the called party answers, a first slow operating relay connected in parallel with said rectifier and condenser, said first relay being adapted to be operated when said talking battery connections are reversed so that said rectifier presents a high impedance to the passage of the reversed battery direct current, a second slow release relay, said first slow operating relay having a set of normally closed contacts to prepare an operating circuit for said second relay, the operation of said first relay being effective to open the normally closed contacts in the operating circuit of said second relay and to connect a holding circuit for said first relay, means to operate said second relay through said normally closed contacts when said selectable connections are connected to a line for completing a chargeable call, the operation of said first and second relays being effective to close series connected switch contacts to connect the fourth control conductor of the selector in each link to the other terminal of said source of power to thereby momentarily energize the operating coil of the peg-count meter of the line circuit selectably connected with the linefinder selector link to indicate a completed call through such calling line circuit.

WILLIAM W. PHARIS.

References Cited in the file of this patent

UNITED STATES PATENTS

| Number | Name | Date |
|---|---|---|
| 2,543,022 | Horwitz | Feb. 22, 1951 |
| 2,546,644 | Lomax | Mar. 27, 1951 |
| 2,550,208 | Taylor et al. | Apr. 24, 1951 |